United States Patent

Coulson

(10) Patent No.: US 9,225,853 B2
(45) Date of Patent: Dec. 29, 2015

(54) VISUAL IMAGES PROCESSED ON PORTIONS OF FOLDED SUBSTRATE

(75) Inventor: John Lawrence Coulson, Pender Island (CA)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 626 days.

(21) Appl. No.: 13/505,723

(22) PCT Filed: Aug. 17, 2011

(86) PCT No.: PCT/US2011/048155
§ 371 (c)(1),
(2), (4) Date: May 2, 2012

(87) PCT Pub. No.: WO2013/025215
PCT Pub. Date: Feb. 21, 2013

(65) Prior Publication Data
US 2013/0044351 A1  Feb. 21, 2013

(51) Int. Cl.
*H04N 1/00* (2006.01)

(52) U.S. Cl.
CPC ....... *H04N 1/00188* (2013.01); *H04N 1/00307* (2013.01); *H04N 1/00347* (2013.01); *H04N 2201/0081* (2013.01); *H04N 2201/0082* (2013.01); *H04N 2201/0096* (2013.01)

(58) Field of Classification Search
CPC ............... H04N 1/00307; H04N 2201/0081; H04N 2201/0082; H04N 1/00347; H04N 2201/0096
USPC ......................................... 358/474, 498, 505
See application file for complete search history.

(56) References Cited

U.S. PATENT DOCUMENTS

| | | | |
|---|---|---|---|
| 5,749,551 A * | 5/1998 | Torres | B41J 3/28 248/205.1 |
| 2004/0046867 A1 | 3/2004 | Silverbrook et al. | |
| 2004/0174432 A1 | 9/2004 | Silverbrook | |
| 2005/0286922 A1 * | 12/2005 | Oki | H04N 1/0058 399/75 |
| 2006/0023251 A1 | 2/2006 | Petteruti et al. | |
| 2007/0121157 A1 | 5/2007 | Silverbrook et al. | |
| 2008/0182620 A1 | 7/2008 | Lors | |

FOREIGN PATENT DOCUMENTS

| | | | |
|---|---|---|---|
| JP | 02310025 A | 12/1990 | |
| JP | 09309080 A | 12/1997 | |
| JP | 10009841 A | 1/1998 | |

(Continued)

OTHER PUBLICATIONS

G. Sharma, Cancellation of show-through in duplex scanning, International Conference on Image Processing, vol. 2, Sep. 2000, 609-612.*

(Continued)

*Primary Examiner* — Eric A Rust
(74) *Attorney, Agent, or Firm* — Brundidge & Stanger, P.C.

(57) ABSTRACT

Technology is described for a handheld device with multimedia content recording and printing ("the described technology"). In various embodiments, the described technology can capture and record images, video, and sound, e.g., by using an image capture sensor and/or scanner. In various embodiments, the described technology can print various types of images, e.g., photographs, postcards, legal documents, and so forth.

23 Claims, 15 Drawing Sheets

(56) References Cited

FOREIGN PATENT DOCUMENTS

| | | |
|---|---|---|
| JP | 2002529290 A | 9/2002 |
| JP | 2002365017 A | 12/2002 |
| JP | 2005173079 A | 6/2005 |
| JP | 2007026527 A | 2/2007 |

OTHER PUBLICATIONS

Canon CP-220 Compact Photo Printer Review, Bob Atkins Photography website, http://www.bobatkins.com/photography/digital/cp220review.html , © Copyright Bob Atkins All rights Reserved, 5 pages [last accessed May 1, 2012].

Canon SELPHY CP720 Portable Photo Printer, Amazon.co.uk website page, © 1996-2012, Amazon.com Inc. or its affiliates, 5 pages [last accessed Apr. 26, 2012].

Casio PCT-1300: portable printer to create a postcard post on ITech and Gadget Diary, © 2010 copyright ITech Diary, 5 pages [last accessed May 1, 2012].

Cho, Nic, "Polaroid Launches New Digital Instant Mobile Photo Printer With ZINK Zero Ink Printing Technology," Jan. 12, 2008 post on My Digital Life website.

Cyber-shot® camera/printer bundle, Sony eSupport—DSC-W80HDPR-Support, one page [last accessed May 1, 2012].

Dualys Full Color Two Sided Plastic Card Printer, http://www.plasticprinter.com/store/dualys.aspx , © 2007 Plasticprinters.com, 2 pages [last accessed Apr. 26, 2012].

Goh, Leonard, "Epson delivers portable photo printer with digital frame," Sep. 29, 2009, post on CNET Asia, © 2012 CBS Interactive, 4 pages.

How do you make 3d postcards Google Search, 2 pages [last accessed May 1, 2012].

PCT International Search Report for International Application No. PCT/US2011/048155 filed Aug. 17, 2011, mailing date: Mar. 26, 2012, 13 pages.

Portable postcard printer Google search, 2 pages [last accessed Apr. 26, 2012].

Reviews for portable printers, Retrevo website, http://www.retrevo.com/samples/Portable-Printers.html, 2 pages [last accessed May 1, 2012.

Sony Digital Photo Printer DPP-FPHD1 Operating Instructions, © 2007 Sony Corporation, 31 pages.

Tan, Sy, Postcard Printer: Sony DPP-FP post on My Digital Life, May 12, 2007, © 2005-2012 My Digital Life, 3 pages.

ZINK Paper Google Search, 2 pages [last accessed May 1, 2012].

"New iphone app for OCR and more "Prizmo"", accessed at http://web.archive.org/web/20100916101343/http://thetechjournal.com/electronics/iphone/new-iphone-app-for-ocr-and-more-prizmo.xhtml , accessed on Dec. 16, 2014, pp. 1-5.

\* cited by examiner

VISUAL IMAGES PROCESSED ON PORTIONS OF FOLDED SUBSTRATE

CROSS-REFERENCE TO RELATED APPLICATIONS

This application is the National Stage filing under 35 U.S.C. §371 of PCT Application Ser. No. PCT/US2011/048155 filed on Aug. 17, 2011. The disclosure of the PCT Application is hereby incorporated herein by reference in its entirety.

BACKGROUND

People use various mobile devices to retrieve, capture, and send information. Digital cameras capture pictures and video. Global positioning system (GPS) units track location and give directions to a destination. Cellular phones can be used to exchange communications with other people, and many can now be used to also exchange electronic mail ("email"). People can also use these and other mobile devices to view and/or edit documents, e.g., letters.

While information is easily accessible in electronic form, people often have to wait to transfer this information to a hard copy. People who take pictures with digital cameras wait until they are at a store or a printer at home before they can make prints of pictures. People who type a letter on a mobile device may wait until they arrive at the office to print out a copy of their letter. People who retrieve online coupons on a data-enabled cell phone may wait until they get home to make printed copies.

Because of the specialized nature of these devices, many people often carry multiple mobile devices to fulfill their information needs. For example, people carry a cell phone to communicate with other people, but often carry a separate camera to take high-resolution pictures. Carrying multiple mobile devices can be problematic in several respects, e.g., portability, convenience, etc.

Handheld devices that are capable of capturing images and video are generally known in the art. Examples include personal digital assistants (PDAs), mobile telephones, and other "mobile computing devices." Some of these mobile computing devices are also capable of electronic communications, e.g., using wireless signals including signals conforming with IEEE 802.11 and cellular telephone standards. Some of these mobile computing devices can also compute geographic position information, e.g., by using GPS or signal triangulation techniques. However, convenient printing features are generally unavailable.

SUMMARY

Technology is described for a handheld device with multimedia content recording and printing ("the described technology"). In various embodiments, the described technology can capture and record images, video, and sound, e.g., by using an image capture sensor and/or scanner. In various embodiments, the described technology can print various types of images, e.g., photographs, postcards, legal documents, and so forth. The described technology also includes communications capabilities (e.g., wireless, cellular telephone, etc.) and position recognition capabilities (e.g., wireless triangulation, GPS, etc.).

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
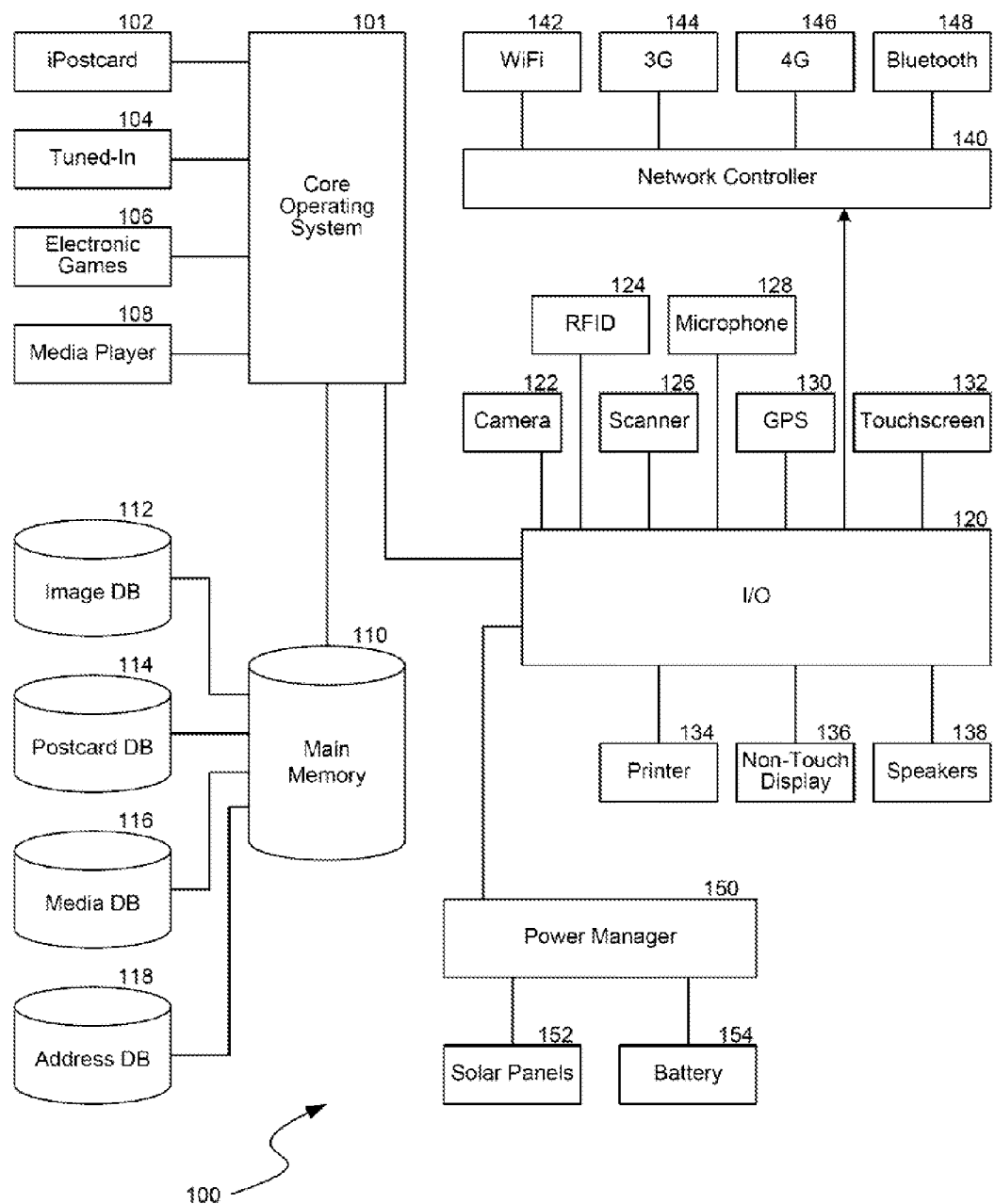
FIG. 1 is a block diagram illustrating components employed by the technology in various embodiments.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Technology is described for a handheld device with multimedia content recording and printing ("the described technology"). In various embodiments, the described technology can capture and record images, video, and sound, e.g., by using an image capture sensor and/or scanner. In various embodiments, the described technology can print various types of images, e.g., photographs, postcards, legal documents, and so forth. The described technology also includes communications capabilities (e.g., wireless, cellular telephone, etc.) and position recognition capabilities (e.g., wireless triangulation, GPS, etc.).

In various embodiments, the mobile computing device may have dimensions of approximately 6.5 inches in length, approximately 4.5 inches in width, and approximately 1.5 inches in depth. Mobile computing devices with these dimensions are comparable to the dimensions of cellular telephone ("smartphone") devices presently in popular use. Despite its relatively small size, the mobile computing device may be able to print on full size (e.g., 8.5 inches wide) paper or both sides of smaller sized paper (e.g., postcard-sized paper). The technology will be described in further detail in relation to the figures.

Turning now to the figures, FIG. 1 is a block diagram illustrating components 100 employed by the technology in various embodiments, e.g., in association with a mobile computing device (not illustrated). The components 100 include a core operating system 101 that is a general-purpose operating system or a special purpose operating system. As an example, the core operating system 101 can be an operating system specifically designed for use in mobile devices, e.g., a real-time operating system. The core operating system 101 may communicate with other components 100 of the technology and also with components not illustrated in FIG. 1.

An iPostcard application 102 provides various features of the described technology, as described in further detail below. As an example, the iPostcard application 102 can be used by a user to generate an electronic postcard, affix an electronic stamp to the generated postcard, and print the postcard so that the user can mail the postcard using conventional mail methods. Thus, the iPostcard application 102 may interoperate with other components of the core operating system 101 to provide postcard-related features desired by the user.

A "Tuned-In" application 104 can provide sound recognition features to the core operating system 101. As an example, the "Tuned-In" application 104 may recognize ambient sounds, provide speech recognition features, etc.

In various embodiments, the mobile device may also provide various entertainment features for users, e.g., electronic games 106 and a media player application 108. The media player application 108 may be capable of rendering multimedia information, e.g., audio, video, etc.

The mobile computing device may include computer-readable storage devices, e.g., main memory 110. The computer-readable storage devices can be implemented as various types of computer-readable media, e.g., non-volatile memory, optical memory, magnetic media, optical media, flash memory, or indeed any type of media on which program instructions or data may be stored and/or retrieved. The main memory 110 (or other computer-readable storage devices) can store various information, e.g., in various databases. As examples, the components 100 can include an image database 112, a postcard database 114, a media database 116, and/or an address database 118. The image database 112 may store images. As an example, the image database 112 may store images that the user has captured using a camera 122 or a scanner 126. Alternatively, the image database 112 may store images that the user has downloaded to the mobile computing device, e.g., via a network controller 140 and/or wired or wireless communications means. Examples of wireless communications means are WiFi 142 (e.g., IEEE 802.11), 3G 144, 4G 146, Bluetooth 148, etc.

The core operating system 101 may enable communications between various components 100, e.g., via an input/output component 120. Various input and/or output components may interoperate with other components 100 by communicating via the input/output component 120. Examples of input/output components that the mobile computing device may include are the camera 122, an RFID chip and/or detector/scanner 124, the image scanner 126, a microphone 128, a GPS 130, a touch screen 132, a printer 134, a display 136 (e.g., non-touch), and speakers 138. The input/output component 120 may also communicate with a power manager 150. The power manager 150 may employ solar panels 152 associated with the mobile computing device and/or a battery 154. As an example, the power manager 150 may communicate battery level information, ambient light information, etc. The solar panels 152 can occupy portions of an exterior shell of the mobile computing device, e.g., portions not occupied by the display screen 136. In various embodiments, the solar panels 152 may be attached in an extendable manner so that additional surface area may be exposed. As an example, several solar panels 152 may be hidden behind an outer shell and the user may extend the panels to minimize battery recharging time.

In various embodiments, the camera 122 may have a high quality zoom lens capable of zooming from a very wide angle field of view to a telephoto field of view. Alternatively, the camera 122 may have a fixed focal length lens.

In various embodiments, the touch screen 132 may enable a user to "write" on images using a freehand writing technique—with or without a stylus. As an example, a user may be able to electronically "write" a message on a postcard.

In various embodiments, the speakers 138 can include one or more transducer-type speakers, e.g., housed in a rear portion of the mobile computing device. When the mobile computing device is placed on a surface, e.g., a rigid surface, the transducer-type speaker may generate a more significant bass sound than conventional speakers associated with mobile computing devices or headsets.

In various embodiments, the mobile computing device may include two or more batteries. As an example, a battery 154 may be a removable battery but a second battery (not illustrated) may be a battery that is not removable. That way, if the mobile computing device needs to power a feature (e.g., to power security functions), the mobile computing device does not need to depend on the presence of the removable battery or solar power. In various embodiments, the non-removable battery may be a rechargeable battery that can be recharged at the same time as the removable battery or at other times.

In various embodiments, the mobile computing device may communicate with other components and devices (not illustrated). As an example, the mobile computing device may be capable of printing to an external printer, e.g., by transmitting images to the external printer. The transmissions can be via wireless communications, wired communications, etc. Various protocols can be used to transmit images including, e.g., Picture Transfer Protocol. As another example, the mobile computing device may be capable of receiving images via a USB connection or a removable storage device (e.g., Compact Flash ("CF") or Secure Digital or ("SD") card), etc.

Figure 2:
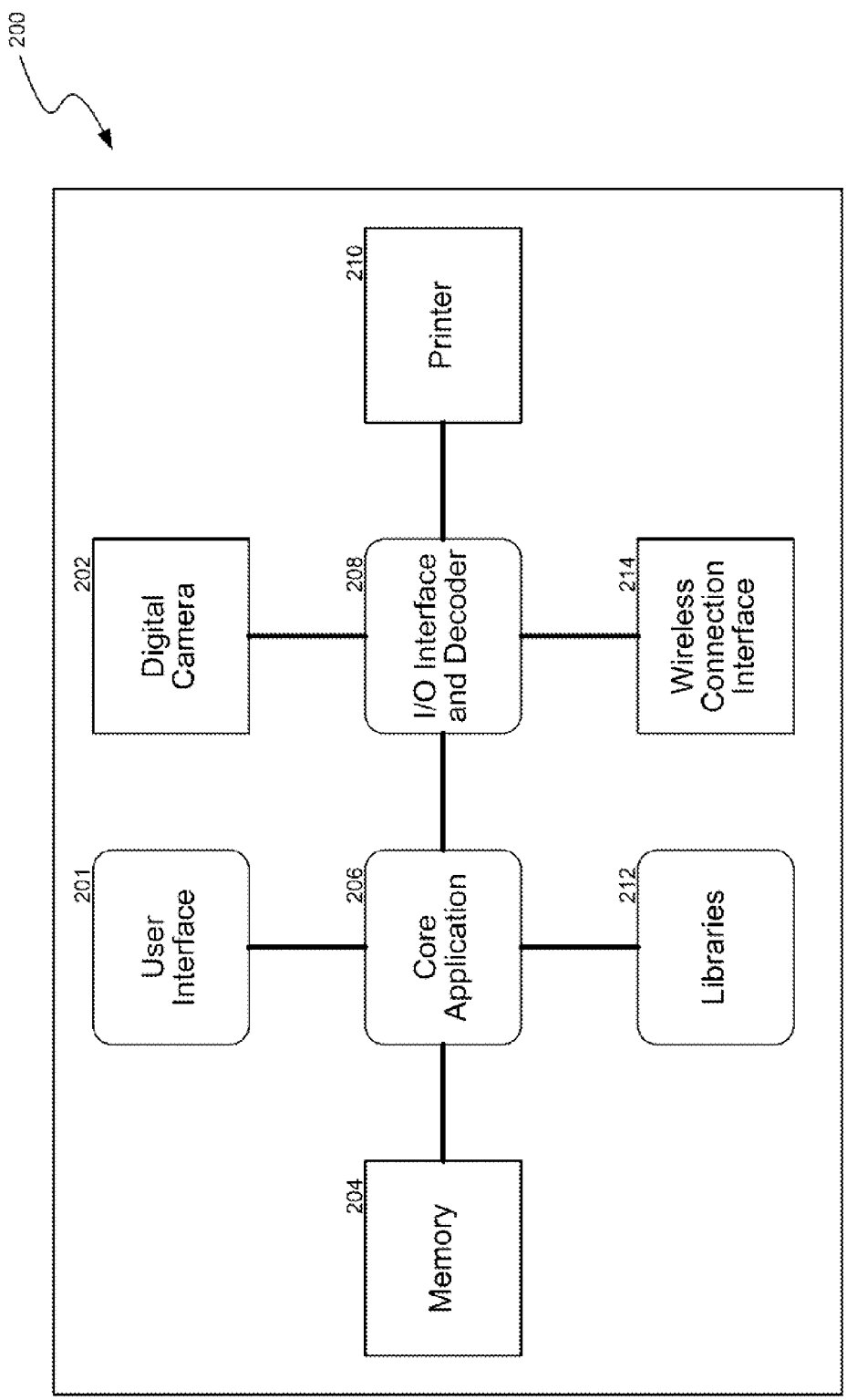
FIG. 2 is a block diagram illustrating components employed by the technology in various embodiments.

FIG. 2 is a block diagram illustrating components 200 employed by the technology in various embodiments. The figure provides a simplified view of some of the components 100 illustrated in FIG. 1. The components 200 can include user interfaces 201, digital cameras 202, memories 204, core applications 206, input/output interfaces and decoders 208, printers 210, libraries 212, and wireless connection interfaces 214. The libraries 212 provide various common routines, e.g., to the applications 206.

Figure 3:
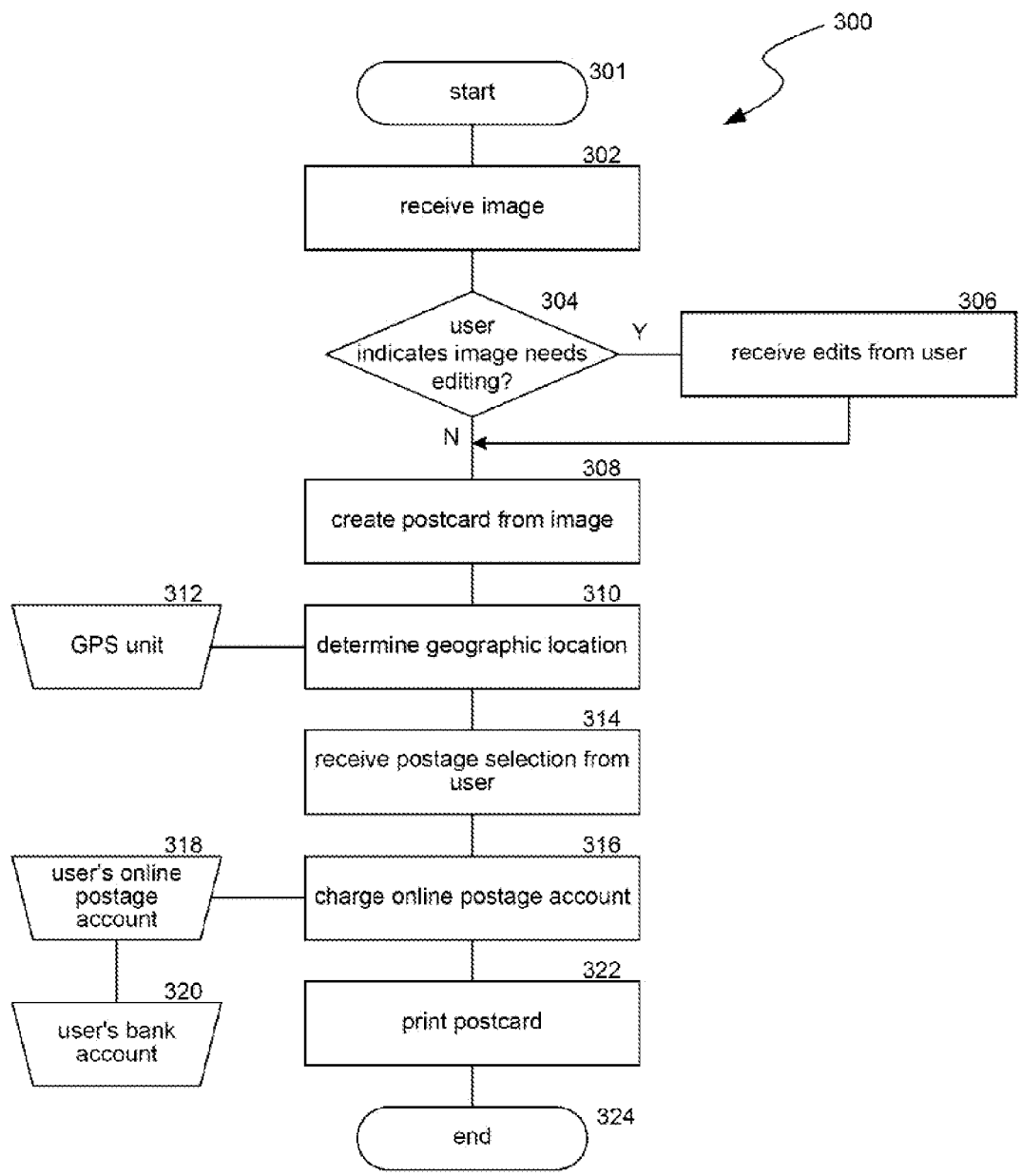
FIG. 3 is a flow diagram illustrating a routine that the technology may invoke in various embodiments, e.g., to create electronic postcards.

FIG. 3 is a flow diagram illustrating a routine 300 that the technology may invoke in various embodiments, e.g., to create electronic postcards. The routine begins at block 301. The routine then continues at block 302, where the routine receives an image. As an example, the routine may receive an image from a camera, a scanner, or from a different component associated with the mobile computing device. The routine then continues at decision block 304, where the routine determines whether it has received an indication from a user that the received image needs editing. If that is the case, the routine continues at block 306. Otherwise, the routine continues at block 308. At block 306, the routine receives edits to the received image. As examples, the routine may receive instructions to crop the image, enhance the image, rotate the image, combine the image with other images, etc. These edits may make the received image suitable for printing on a postcard. The routine then continues at block 308. At block 308, the routine creates a postcard from the received (and possibly edited) image. The routine then continues at block 310. At block 310, the routine determines the geographical location at which the mobile computing device is presently being operated. As an example, the routine may receive this information from a GPS unit 312. The routine then continues at block 314. At block 314, the routine receives a selection of postal service information from the user. As an example, the routine may receive an instruction from the user indicating that the postcard is to be sent via first class mail. The routine then continues at block 316. At block 316, the routine charges an online postage account 318 associated with the user, e.g., for the value of postage and possibly for handling fees. The user's online postage account 318 may be able to receive additional funds, if necessary, from the user's bank account 320. Thus, for example, when the user is traveling and unable to access an automated teller machine or bank institution, the user may nevertheless still be able to send postcards via conventional mail. The routine then continues at block 322. At block 322, the routine prints the postcard, perhaps with an appropriate postage stamp. As an example, the routine may cause a printer associated with the mobile computing device to print the postcard. The routine then ends at block 324.

In various embodiments, the described technology enables users to electronically select and affix stamps bearing various images. Printing and mailing postcards may be attractive to some users who reminisce about affixing postage stamps bearing an image of a local landmark. For example, users traveling to Egypt may want to add postage stamps bearing an image of pyramids.

In various embodiments, the routine may download photographs from a digital camera, e.g., using a Picture Transfer Protocol, so that the user can create a postcard from a photograph taken with a different camera.

Those skilled in the art will appreciate that the logic illustrated in FIG. 3 and described above, and in each of the flow diagrams discussed below, may be altered in a variety of ways. For example, the order of the logic may be rearranged, sublogic may be performed in parallel, illustrated logic may be omitted, other logic may be included, etc. In various embodiments, portions of the routine may be executed by a server computing device, a client computing device, or other computing devices.

Figure 4:
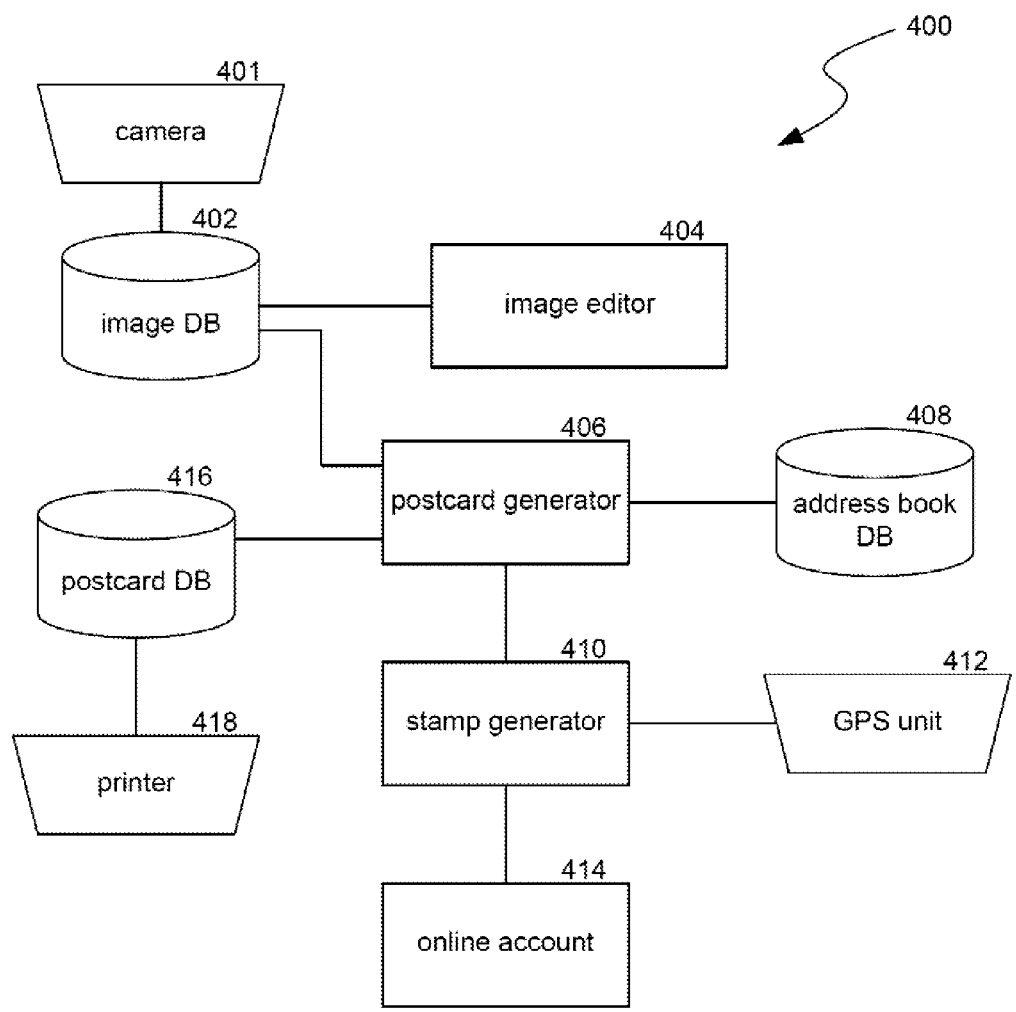
FIG. 4 is a block diagram illustrating components employed by the technology in various embodiments.

FIG. 4 is a block diagram illustrating components 400 employed by the technology in various embodiments. The components include a camera 401 and an image database 402. As previously explained, in some embodiments, the image database 402 may store images received from the camera 401. In other embodiments (not illustrated), the image database 402 may receive and store images from a scanner or other input devices. As an example, the image database 402 may store still images retrieved from a video sequence. The user may employ an image editor 404 to modify images stored in the image database 402, e.g. to prepare an image for printing as a postcard. A postcard generator 406 can employ images stored in the image database 402 to generate postcards. The postcard generator 406 may employ address book entries stored in an address book database 408, e.g., so that the user does not need to remember and/or write down names and addresses of people to whom the user desires to send postcards. The postcard generator 406 may store generated postcards in a postcard database 416. The postcard generator 406 may also retrieve templates for postcards from the postcard database 416. The generated postcards may then be printed to a printer 418 associated with the mobile computing device. In various embodiments, a stamp generator 410 may generate stamps based on the current geographical position of the mobile computing device, e.g., based on information received from a GPS unit 412. The stamp generator 410 may debit an online account 414 of the user, e.g., based on the value of the stamp. The stamp generator 410 may also generate stamp images for use by the postcard generator 406 to include with the postcard.

Figure 5:
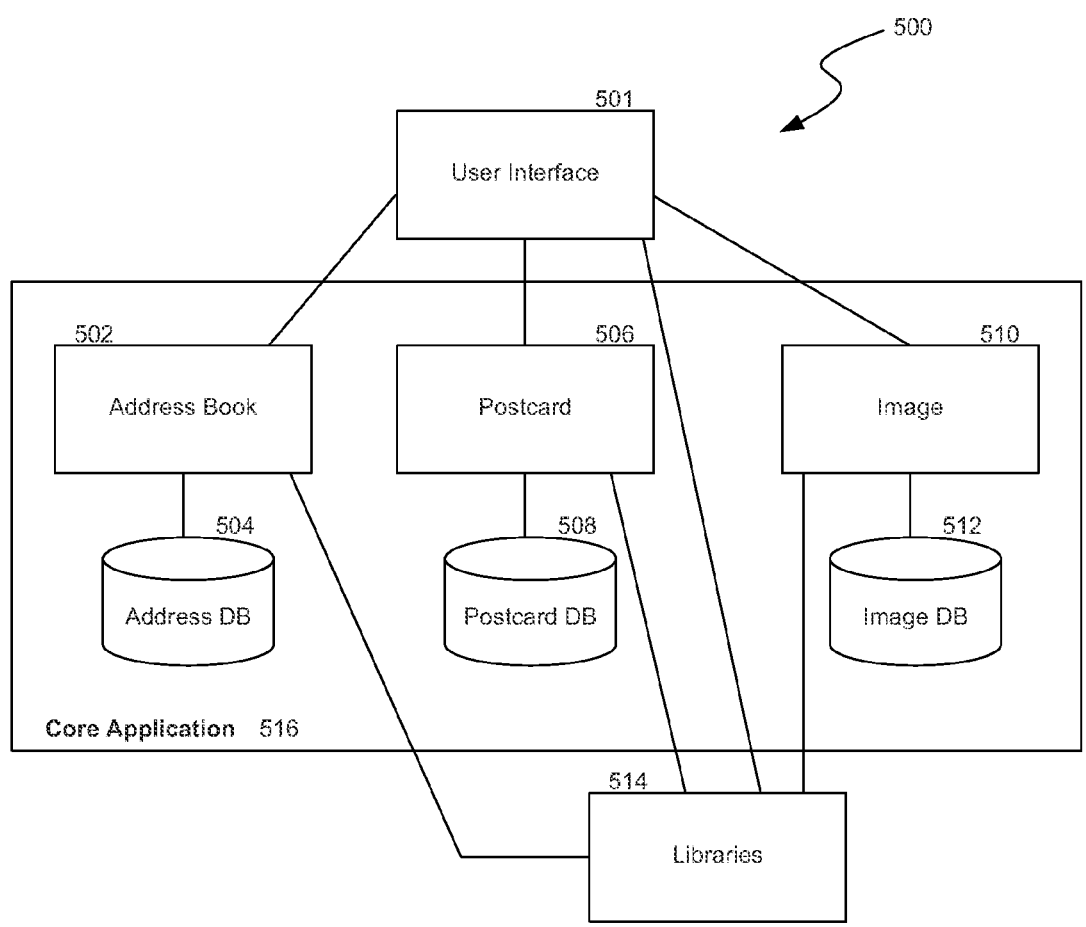
FIG. 5 is a block diagram illustrating components employed by the technology in various embodiments.

FIG. 5 is a block diagram illustrating components 500 employed by the technology in various embodiments. The figure provides a simplified view of some of the components 100 illustrated in FIG. 1. A user interface component 501 provides a user interface that a user may use to interact with various components of the described technology. As examples, the user interface component 501 enables the user to interact with an address book component 502, a postcard component 506, and an image component 510. The address book component 502 enables interactions with an address database 504, e.g., to retrieve and/or store postal address information. The postcard component 506 enables interactions with a postcard database 508, e.g., to retrieve and/or store postcards, postcard templates, etc. The image component 510 enables interactions with an image database 512, e.g., to retrieve and/or store images. The address book component 502, postcard component 506, and image component 510 may function as components of a core application 516, e.g., in conjunction with libraries 514.

Figure 6:
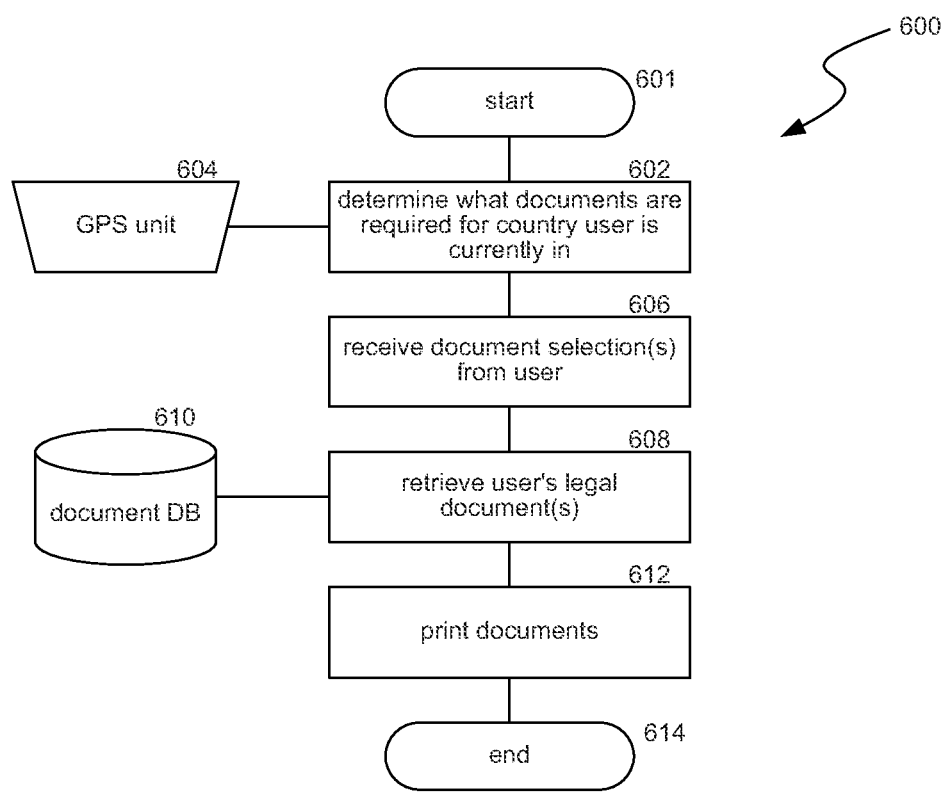
FIG. 6 is a flow diagram illustrating a routine that the technology may invoke in various embodiments, e.g., to print legal documents.

FIG. 6 is a flow diagram illustrating a routine 600 that the technology may invoke in various embodiments, e.g., to print legal documents. The routine begins at block 601. The routine then continues at block 602. At block 602, the routine determines which legal documents may be required for the country in which the user is presently located. As an example, the routine may retrieve geographical position information, e.g., from a GPS unit 604. The routine may provide the position information to a server and receive a list of documents from the server. Examples of such legal documents include, e.g., passports, visas, driver's licenses, etc. The routine then continues at block 606. At block 606, the routine receives selections from the user indicating which documents the user may need or desire. As an example, a user may have misplaced a subset of the required set of documents and may indicate the needed subset. The routine then continues at block 608. At block 608, the routine retrieves the selected documents. As an example, the routine may retrieve the documents from a server. For example, the routine may identify a suitable government agency (e.g., nearest embassy), contact a server associated with the embassy, and retrieve documents from the server of the embassy. Alternatively, the routine may retrieve documents from a document database 610. The routine then continues at block 612. At block 612, the routine prints the retrieved documents. The routine then ends at block 614.

Figure 7:
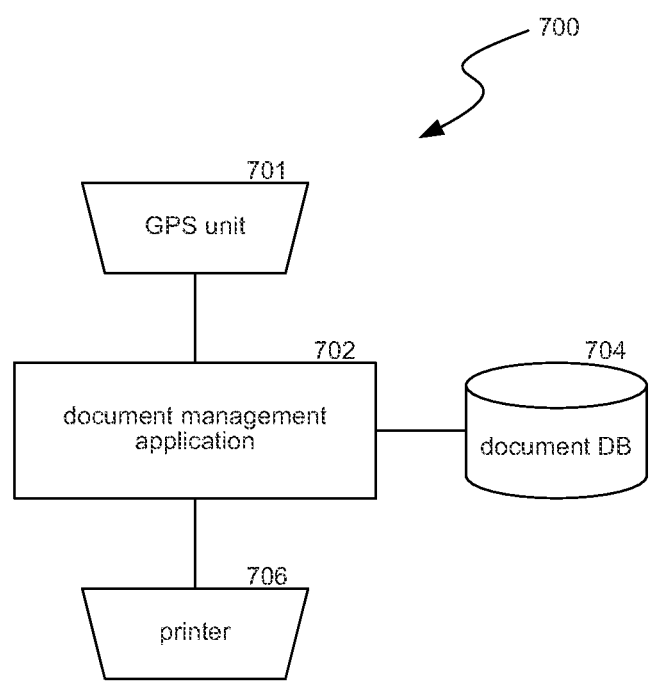
FIG. 7 is a block diagram illustrating components employed by the technology in various embodiments.

FIG. 7 is a block diagram illustrating components 700 employed by the technology in various embodiments. The components 700 can include a GPS unit 701, a document management application 702, a document database 704, and a printer 706. The document management application 702 may receive geographical position information from the GPS unit 701, retrieve documents from the document database 704, and print the retrieved documents using the printer 706.

Figure 8:
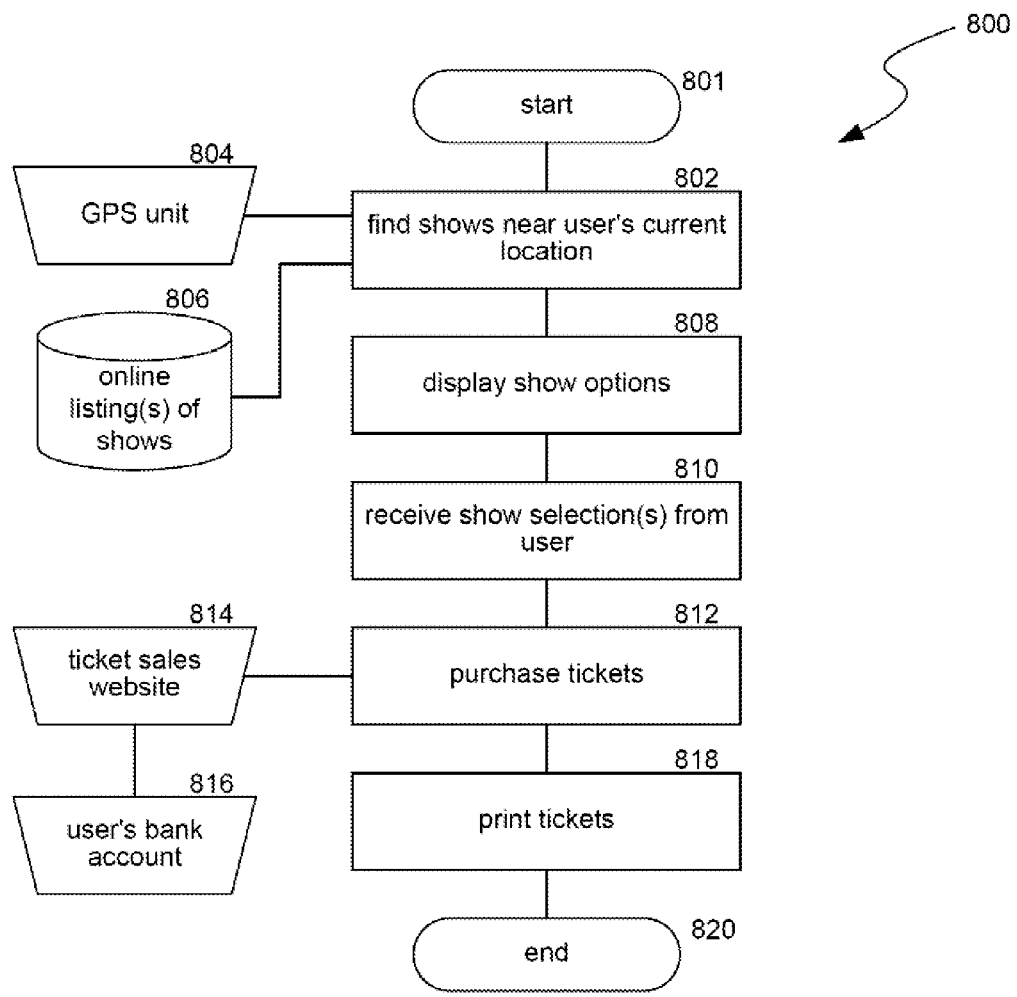
FIG. 8 is a flow diagram illustrating a routine that the technology may invoke in various embodiments, e.g., to generate admission tickets to events.

FIG. 8 is a flow diagram illustrating a routine 800 that the technology may invoke in various embodiments, e.g., to generate admission tickets to events. The routine begins at block 801. The routine then continues at block 802. At block 802, the routine identifies shows near a user's current location. As an example, the routine may receive position information from a GPS unit 804. Alternatively, the routine may receive an indication of a future position from the user. The routine may retrieve a listing of shows at the position information identified by either the GPS unit or the user, e.g., from an online listing of shows 806. The routine then continues at block 808, where it displays options to a user, e.g., locations of shows, content of shows, timing of shows, etc. The routine then continues at block 810, where it receives one or more selections of shows from the user. The routine then continues at block 812, where it may receive an indication from the user to purchase tickets for selected shows. If that is the case, the routine may employ a ticket sales website 814 to purchase tickets and may employ a user's bank account 816 to pay for the tickets. The routine then continues at block 818, where it prints the purchased tickets. The routine then ends at block 820.

Figure 9:
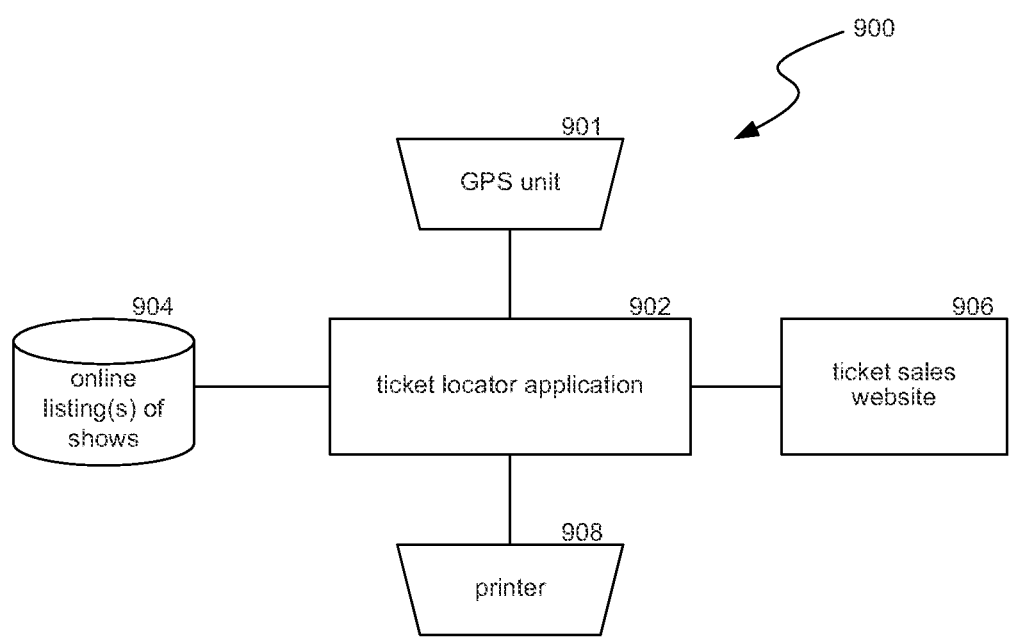
FIG. 9 is a block diagram illustrating components employed by the technology in various embodiments.

FIG. 9 is a block diagram illustrating components 900 employed by the technology in various embodiments. A GPS unit 901 may provide geographical position information, e.g., to a ticket locator application 902. The ticket locator application 902 may retrieve online listings from a database 904, and employ services of a ticket sales Web service or website 906 to purchase tickets. The ticket locator application 902 may then print the purchased tickets at a printer 908.

Figure 10:
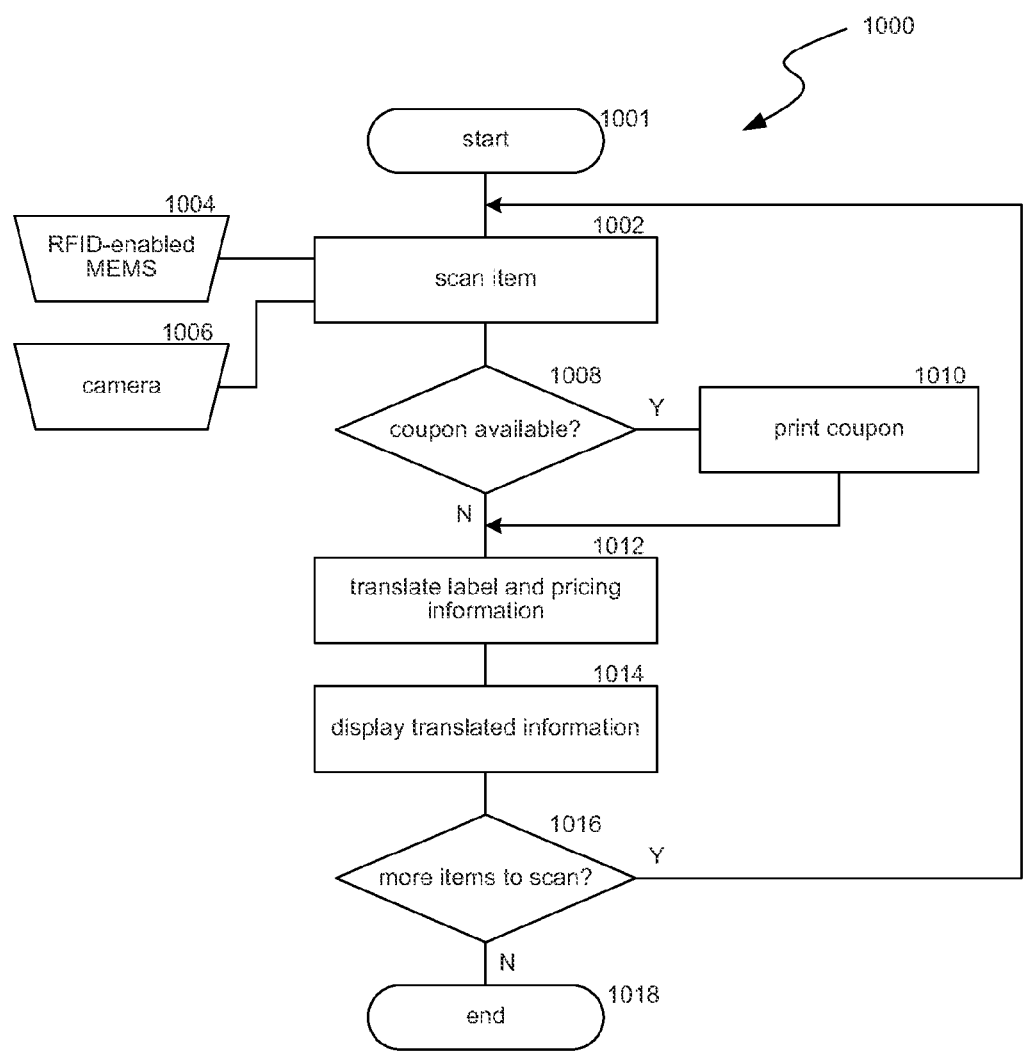
FIG. 10 is a flow diagram illustrating a routine that the technology may invoke in various embodiments, e.g., to generate coupons.

FIG. 10 is a flow diagram illustrating a routine 1000 that the technology may invoke in various embodiments, e.g., to generate coupons. The routine begins at block 1001. The routine then continues at block 1002, where it scans an item. As an example, a user may use the mobile computing device to scan an item's barcode (or other aspects of the item, e.g., its label or shape) using a camera built into the mobile computing device, an RFID detector built into the mobile computing device, or by using other means associated with the mobile computing device. As examples, the mobile computing device may employ an RFID-enabled microelectromechanical system (MEMS) device 1004 or a camera 1006 to identify an item. The routine then continues at decision block 1008, where the routine determines whether a coupon is available for the scanned item. If the routine determines that a coupon is available, the routine continues at block 1010. Otherwise, the routine continues at block 1012. At block 1010, the routine prints the available coupon. At block 1012, the routine translates the label on the item and pricing information. As an example, when the user is traveling, the user may be unable to read the item's label because the label is in a foreign language. Moreover, the user may find it difficult to easily convert pricing information into a currency with which the user is familiar. As an example, when the user is traveling in the Middle East, an item's label may only be in Arabic and the pricing information may be in a local currency. However, the user may be able to read only English and may desire to see the price converted to dollars or euros. The routine may translate the information either using software installed on the mobile computing device or by transmitting information to a server that returns a translated result. The routine then continues at block 1014, where it displays the translated information. The routine then continues at decision block 1016, where it determines whether there are more items to be scanned. If there are more items to be scanned, the routine continues at block 1002. Otherwise, the routine ends at block 1018.

In various embodiments, the described technology enables a user to see what offers or coupons a particular store or merchant has. The user can use a camera to capture an image of the storefront and, using GPS location information and image recognition, the routine can identify the store and retrieve coupons or advertisements pertinent to the store.

Figure 11:
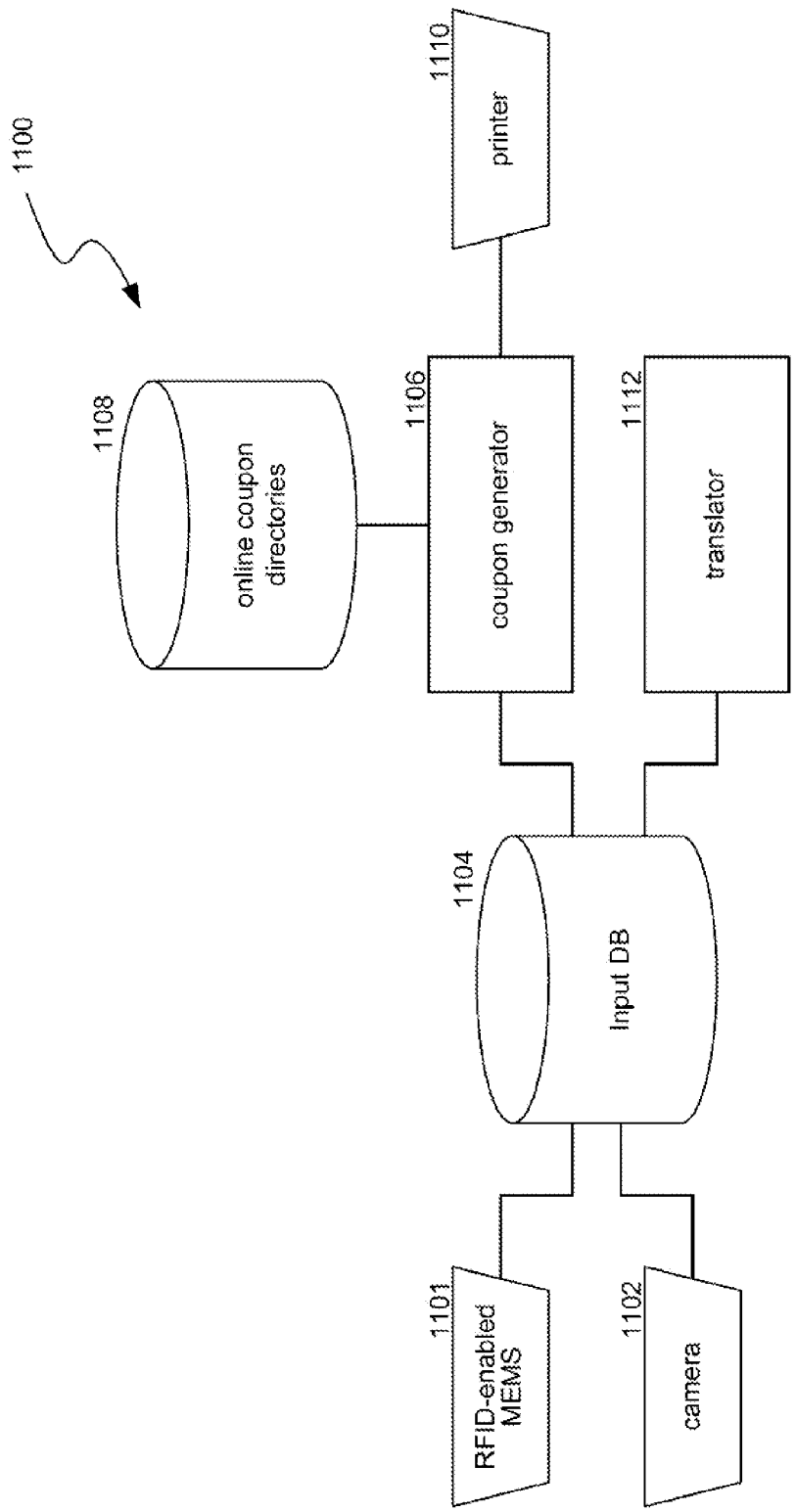
FIG. 11 is a block diagram illustrating components employed by the technology in various embodiments.

FIG. 11 is a block diagram illustrating components 1100 employed by the technology in various embodiments. The components 1100 can include an RFID scanner (e.g., an RFID-enabled MEMS scanner) 1101 and a camera 1102, e.g., to identify a particular item. An input database 1104 may retrieve and/or store information contained in RFID tags associated with products by using the scanner 1101 and/or item information retrieved via an image captured by the camera 1102. A coupon generator component 1106 may retrieve coupons from an online coupon directory 1108, e.g., based on the identification(s) stored in the input database 1104. The coupon generator 1106 may print coupons, e.g., at a printer 1110. A translator component 1112 may translate information (e.g., labels, pricing, ingredients, etc.), stored in the input database 1104.

Figure 12:
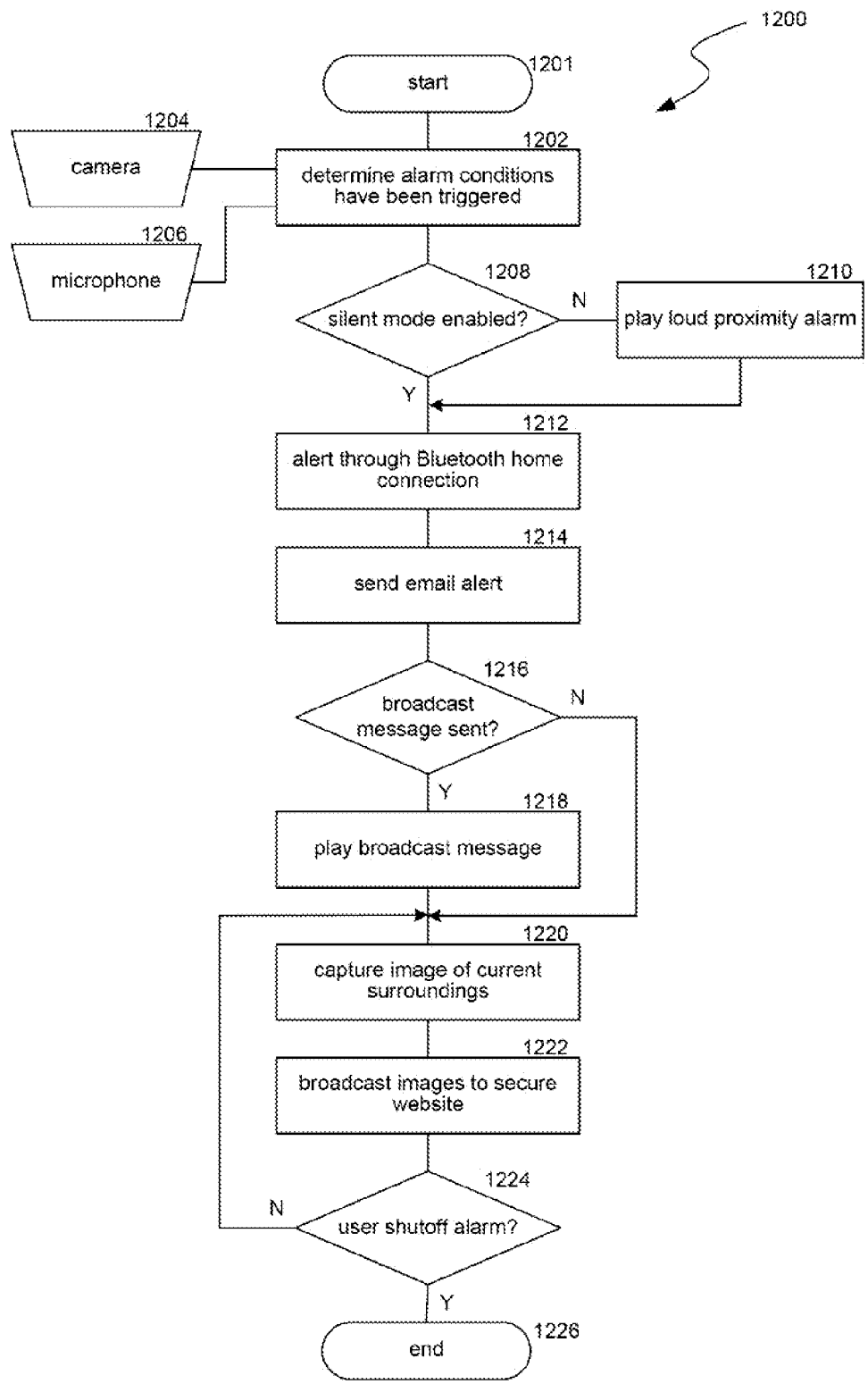
FIG. 12 is a flow diagram illustrating components employed by the technology in various embodiments, e.g., to discourage theft of a mobile device.

FIG. 12 is a flow diagram illustrating a routine 1200 employed by the technology in various embodiments, e.g., to discourage theft of a mobile device. The routine begins at block 1201. The routine then continues at block 1202. At block 1202, the routine determines whether alarm conditions have been triggered. As an example, the routine may determine that an alarm condition has been triggered when the mobile computing device is removed from a particular geographical area. Alternatively, the routine may determine that the mobile computing device is in an area in which an owner of the mobile computing device typically does not visit. The routine may make a determination, e.g., based on inputs from a camera 1204 (unfamiliar surroundings) or a microphone 1206 (unfamiliar sounds). Alternatively, the owner may have indicated that the feature is to be enabled until the owner turns off the security feature. In such a case, the routine may determine that the alarm condition is triggered based on inputs from the camera or the microphone because images and/or ambient sound conditions may change during or after the theft. The routine then continues at decision block 1208, where the routine determines whether a silent mode has been enabled. If the silent mode has been enabled, the routine continues at block 1212. Otherwise, the routine continues at block 1210. If the silent mode is not enabled, the routine plays a loud audible alarm at block 1210. The routine then continues at block 1212. At block 1212, the routine sends an alert to the owner via various communications means. As examples, the routine may alert the owner by using a Bluetooth connection or WiFi network (as illustrated in block 1212); via email (as illustrated in block 1214), or indeed via any communications means available to the mobile computing device (e.g., SMS texting, etc.). The routine then continues at decision block 1216, where the routine determines whether the owner has indicated that a broadcast message is to be sent. If the routine determines that a broadcast message is to be sent, the routine continues at block 1218. Otherwise, the routine continues at block 1220. At block 1218, the routine plays a broadcast message. As an example, the routine may make several telephone calls and play the broadcast message to each person who responds to the placed telephone calls. The routine then continues at block 1220. At block 1220, the routine captures an image of the current surroundings, e.g. using the camera 1204. The routine then continues at block 1222, where it broadcasts the images, e.g., to a secure website. That way, people viewing the secure website may be able to determine where the mobile computing device is presently located. The routine then continues at decision block 1224, where the routine determines whether a user has shut off the alarm, e.g., by entering a password. If the user has shut off the alarm, the routine ends at block 1226. Otherwise, the routine continues at block 1220. In various embodiments, the routine may also receive geographical position information, e.g., from a GPS, and transmit the geographical position information.

In various embodiments, the routine may identify an alarm condition when it detects motion and the user has not turned off an alarm feature within a specified time period. If the alarm condition is satisfied, then the mobile computing device may sound a load alarm, transmit messages, etc., to indicate that the mobile computing device may be in the process of being stolen. The device may detect motion using its MEMS sensors, comparing a present image received by the camera to a previous image received when the device was stationary, etc.

Figure 13:
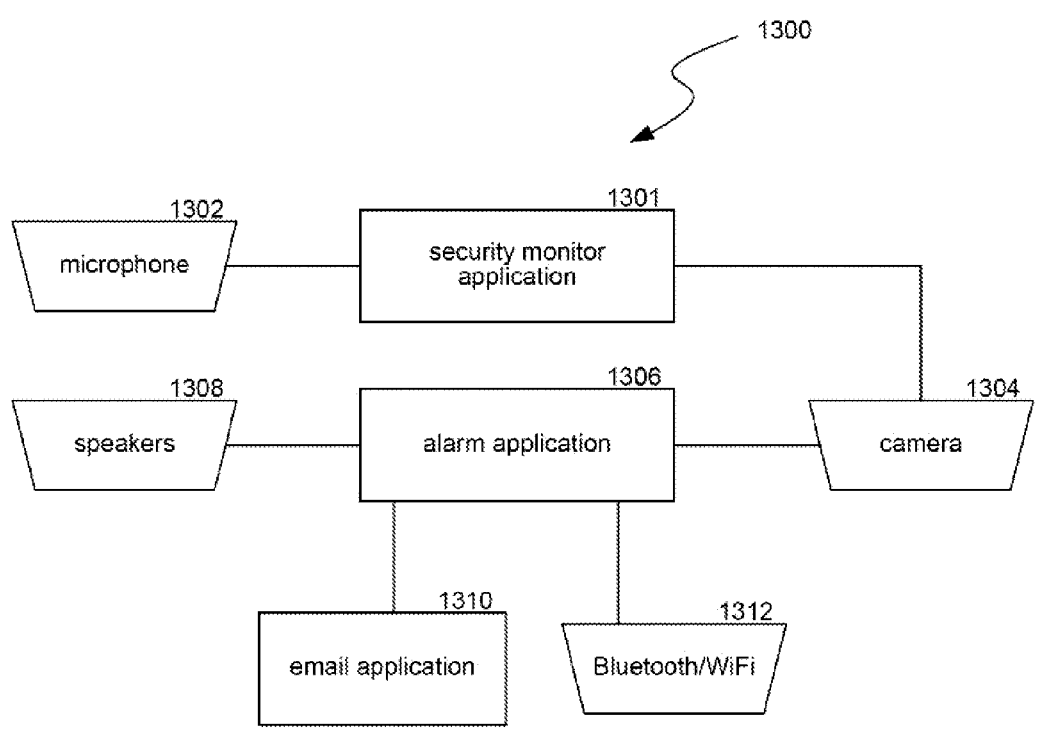
FIG. 13 is a block diagram illustrating components employed by the technology in various embodiments.

FIG. 13 is a block diagram illustrating components 1300 employed by the technology in various embodiments. The components include a security monitor application 1301. The security monitor application 1301 can capture live audio via a microphone 1302 and live video from a camera 1304, e.g., to determine whether alarm conditions have been met. If alarm conditions have been met, the security monitor application 1301 may trigger alarm application 1306 to transmit the alarms. The alarm application 1306 may employ speakers 1308 to play loud alarms, broadcast messages, etc.; a secure website 1314, e.g., to broadcast images; an email application 1310, e.g., to transmit email messages; and a Bluetooth or WiFi component 1312 to transmit wireless messages.

Figure 14:
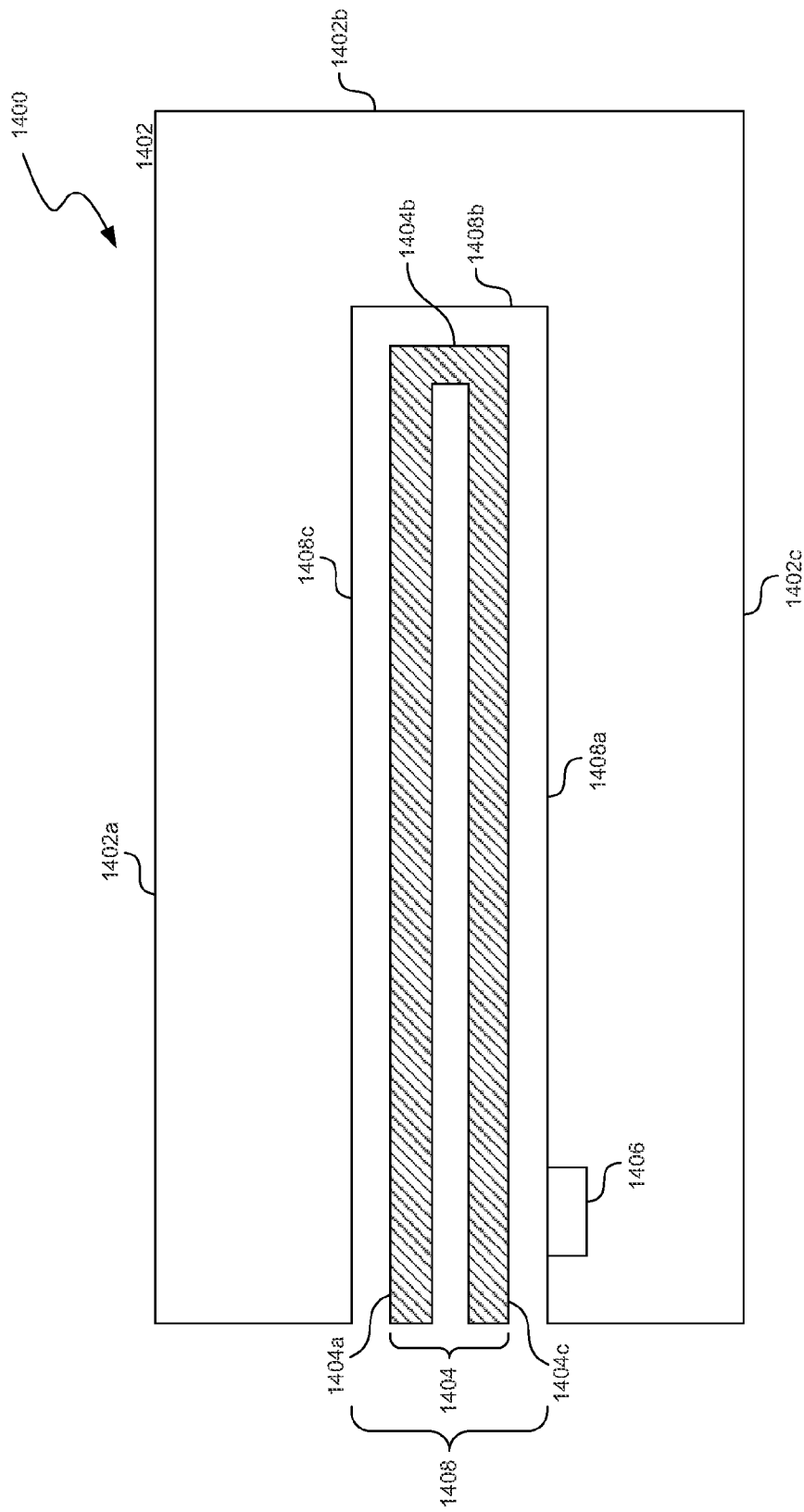
FIG. 14 is a cross-sectional diagram of a mobile computing device illustrating a printer feature.

FIG. 14 is a cross-sectional diagram of a mobile computing device 1400 illustrating a printer feature. The mobile computing device 1400 is illustrated in a cross sectional view 1402. In this view, the mobile computing device includes a top 1402a, a side 1402b, and a bottom 1402c. The mobile computing device 1400 may have an opening (or "gap region") 1408 that has a first surface partition ("wall portion") 1408a and a second surface partition 1408c. The first surface partition 1408a and the second surface partition 1408c may be connected via a surface 1408b. The opening is configured to receive a document page or other substrate 1404. The substrate 1404 can be folded, thereby having a first surface 1404a, a second surface 1404b, and a third surface 1404c. When so inserted, a printer head ("graphical processing head") 1406 is capable of traveling around the substrate, e.g., along surfaces 1408a, 1408b, and 1408c, thereby to print on the substrate surfaces 1404c, 1404b, and 1404a, respectively. Because a folded substrate, e.g., a folded paper, occupies much less surface area than a full sheet, the illustrated printer can occupy a small amount of space (e.g., the size of a mobile computing device), yet print on a full sheet of paper. As an example, the mobile computing device may have dimensions of approximately 4.5 inches along the top and bottom 1402a and 1402c; and approximately 1.5 inches along side 1402b. Moreover, by printing along surface 1404b, the printer can print along the outside crease of the folded substrate so that when the substrate 1404 is flattened, there is no gap in the printout. In various embodiments, the printer head 1406 may be capable of scanning the substrate 1404 to create a digital image.

One skilled in the art will appreciate that the printer head 1406 can be a dot matrix head, ink jet head, laser printer head, or indeed any other type of printer head. Moreover, one skilled in the art will appreciate that various electromechanical linkages are not illustrated, e.g., linkages that would permit the printer head 1406 to travel along surfaces 1408a, 1408b, and 1408c.

In some embodiments, the mobile computing device 1400 can interface with a "snap-in" docking tray that adds depth but not circumference. The docking tray can house various substrates 1404 (e.g., card stock, photographic paper, printing paper, etc.), whether blank or preprinted, and automatically feed the printer. As an example, a user may insert postcards with preprinted stamps.

Figure 15:
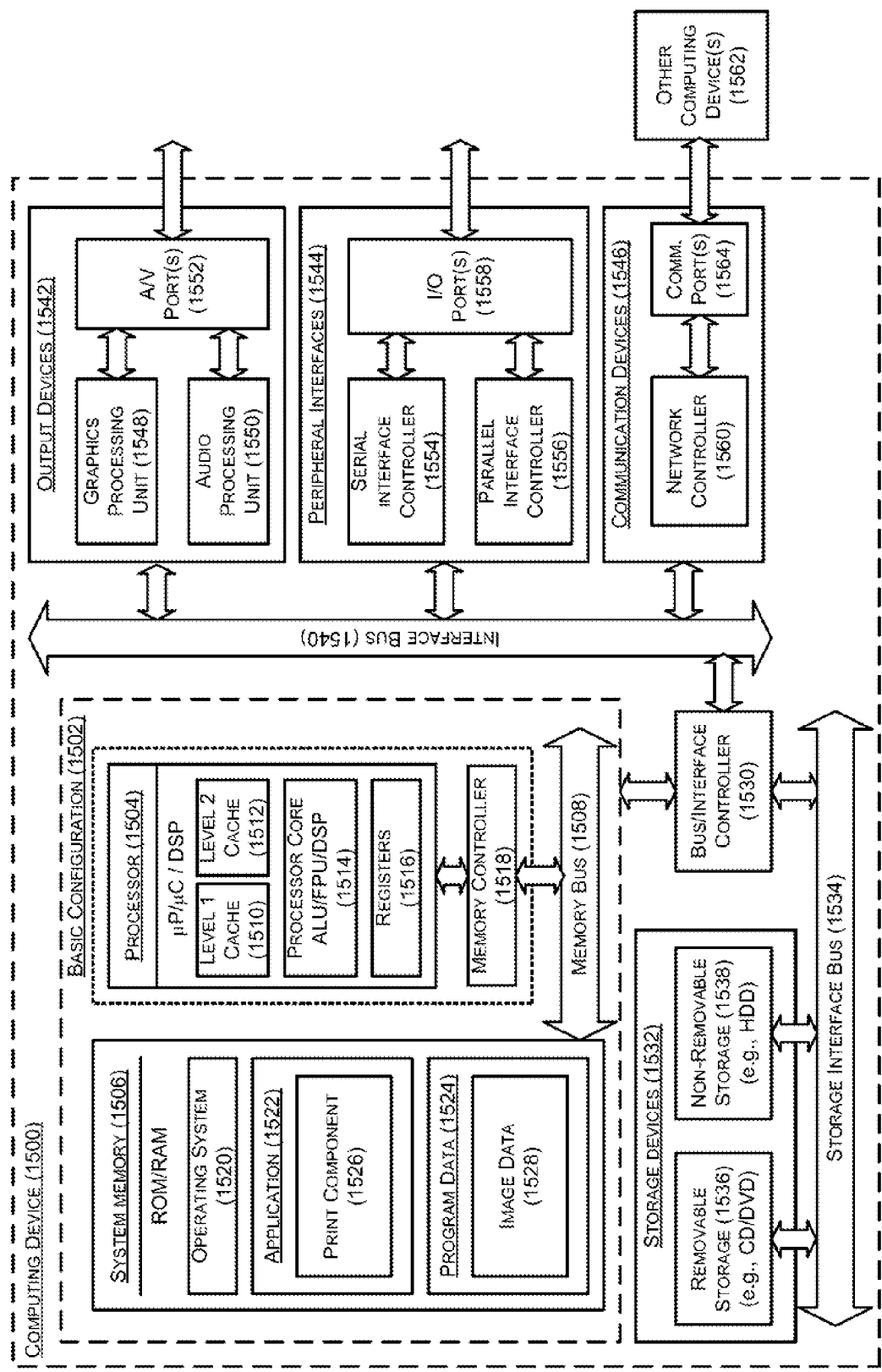
FIG. 15 is a block diagram of an illustrative embodiment of a computing device that is arranged in accordance with at least some embodiments of the present disclosure.

FIG. 15 is a block diagram illustrating an example computing device 1500 that is arranged in accordance with at least some embodiments of the present disclosure. In a very basic configuration 1502, computing device 1500 typically includes one or more processors 1504 and a system memory 1506. A memory bus 1508 may be used for communicating between processor 1504 and system memory 1506.

Depending on the desired configuration, processor 1504 may be of any type including but not limited to a microprocessor ($\mu$P), a microcontroller ($\mu$C), a digital signal processor (DSP), or any combination thereof. Processor 1504 may include one more levels of caching, such as a level one cache 1510 and a level two cache 1512, a processor core 1514, and registers 1516. An example processor core 1514 may include an arithmetic logic unit (ALU), a floating point unit (FPU), a digital signal processing core (DSP Core), or any combination thereof. An example memory controller 1518 may also be used with processor 1504, or in some implementations memory controller 1518 may be an internal part of processor 1504.

Depending on the desired configuration, system memory 1506 may be of any type including but not limited to volatile memory (such as RAM), non-volatile memory (such as ROM, flash memory, etc.) or any combination thereof. System memory 1506 may include an operating system 1520, one or more applications 1522, and program data 1524. Application 1522 may include a print component 1526 that is arranged to print documents or two sides of a substrate, including a folded side. Program data 1524 may include image data 1528, as is described herein. In some embodiments, application 1522 may be arranged to operate with program data 1524 on operating system 1520 such that printing can occur across a fold if a folded page without loss of image quality. This described basic configuration 1502 is illustrated in FIG. 15 by those components within the inner dashed line.

Computing device 1500 may have additional features or functionality, and additional interfaces to facilitate communications between basic configuration 1502 and any required devices and interfaces. For example, a bus/interface controller 1530 may be used to facilitate communications between basic configuration 1502 and one or more data storage devices 1532 via a storage interface bus 1534. Data storage devices 1532 may be removable storage devices 1536, non-removable storage devices 1538, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 1506, removable storage devices 1536 and non-removable storage devices 1538 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 1500. Any such computer storage media may be part of computing device 1500.

Computing device 1500 may also include an interface bus 1540 for facilitating communication from various interface devices (e.g., output devices 1542, peripheral interfaces 1544, and communication devices 1546) to basic configuration 1502 via bus/interface controller 1530. Example output devices 1542 include a graphics processing unit 1548 and an audio processing unit 1550, which may be configured to communicate to various external devices such as a display or speakers via one or more A/V ports 1552. Example peripheral interfaces 1544 include a serial interface controller 1554 or a parallel interface controller 1556, which may be configured to communicate with external devices such as input devices (e.g., keyboard, mouse, pen, voice input device, touch input device, etc.) or other peripheral devices (e.g., printer, scanner, etc.) via one or more I/O ports 1558. An example communication device 1546 includes a network controller 1560, which may be arranged to facilitate communications with one or more other computing devices 1562 over a network communication link via one or more communication ports 1564.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 1500 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 1500 may also be implemented as a personal computer including both laptop computer and non-laptop computer configurations.

In various embodiments, a graphical processing device comprises a processing port having a first wall portion spaced apart from a second wall portion to define a gap region therebetween, wherein the gap region is configured to receive a folded substrate having a first surface portion facing the first wall portion, a second surface portion facing the second wall portion, and a folded surface portion extending therebetween; and at least one graphical processing head movably disposed proximate the processing port, wherein the at least one graphical processing head is configured to process visual images on the first and second surface portions of the folded substrate when the folded substrate is disposed in the gap region. The graphical processing head can be configured to process contiguous visual images on the first, second, and folded surface portions of the folded substrate when the folded substrate is disposed in the gap region. The graphical processing head can include a print head configured to print contiguous visual images on the first, second, and folded surface portions of the folded substrate when the folded substrate is disposed in the gap region. The folded substrate can be a preprinted substrate containing contiguous visual images on the first, second, and folded surface portions thereof, and the graphical processing head can include a scanner configured to scan the contiguous visual images on the first, second, and folded surface portions of the folded substrate when the folded substrate is disposed in the gap region.

In various embodiments, a printer can comprise a printing port having a first guide wall spaced apart from a second guide wall to define a gap region therebetween, wherein the gap region is configured to receive a folded piece of paper having a first surface portion facing the first guide wall, a second surface portion facing the second guide wall, and a folded surface portion extending between the first and second surface portions; and at least one print head movably disposed proximate the printing port, wherein the at least one print head is configured to print contiguous visual images on the first, second, and folded surface portions of the folded piece of paper when the folded piece of paper is received in the gap region. The printing port can be configured to receive a folded sheet of paper that is at least 6 inches wide. The printing port can include an end wall extending between the first and second guide walls opposite an opening, and the end wall can be spaced apart from the opening by at least 6 inches. The print head can be movably coupled proximate the first guide wall for printing the contiguous visual images on the first surface portion, and the at least one print head can be movably coupled proximate the second guide wall for printing the contiguous visual images on the second surface portion. The printing port can include an end wall extending between the first and second guide walls opposite an opening, and the print head can be a single print head configured to traverse the first guide wall, the second guide wall, and the end wall as the single print head prints the contiguous visual images on the first, second, and folded surface portions of the folded piece of paper. A paper cartridge may be positioned proximate the printing port and configured to hold a plurality of folded pieces of paper. The print head can include a visual image scanner. The printer can include a processor operably coupled to memory and the print head, wherein the print head is configured to print an image stored in memory on the first, second, and folded surface portions of the folded piece of paper in response to instructions from the processor. The printer can also include a camera; and a processor configured to store a digital image from the camera in memory, wherein the print head is configured to print the digital image on the first, second, and folded surface portions of the folded piece of paper in response to instructions from the processor.

In various embodiments, the described technology includes a scanner having a folded piece of paper having a first surface portion facing a first direction, a second surface portion facing a second direction opposite the first direction, and a folded surface portion extending between the first and second surface portions proximate an end wall of the slot; and at least one scan head movably disposed proximate the scanning slot, wherein the at least one scan head is configured to scan visual images on the first, second, and folded surface portions of the folded piece of paper when the folded piece of paper is disposed in the gap region.

In various embodiments, the technology includes a handheld mobile computing device having a printing port configured to receive a folded piece of paper having a first surface portion facing a first direction, a second surface portion facing a second direction opposite the first direction, and a folded surface portion extending between the first and second surface portions; and at least one print head movably disposed proximate the printing port, wherein the at least one print head is configured to print visual images on the first, second, and folded surface portions of the folded piece of paper when the folded piece of paper is received in the printing port. The handheld mobile device can include a camera, wherein the print head is configured to print visual images from the camera on the first, second, and folded surface portions of the folded piece of paper when the folded piece of paper is received in the printing port. The handheld mobile device can include a zoom lens capable of zooming from a wide angle to a telephoto angle. The handheld mobile device can include a wireless Internet access facility, wherein the print head is configured to print visual images downloaded via the wireless Internet facility on the first, second, and folded surface portions of the folded piece of paper when the folded piece of paper is received in the printing port. The handheld mobile device can include a microphone component and a speaker component. The measurements of the handheld mobile device may be less than 7 inches in a first dimension, less than 5 inches in a second dimension, and less than 2 inches in a third dimension. The handheld mobile device can include a microelectromechanical system (MEMS) configured to detect movement and/or orientation of the handheld mobile device. The handheld mobile device can include a display, wherein an orientation of an image rendered on the display is modified based on a signal received from the MEMS. The handheld mobile device can include a removably attached tray capable of housing zero or more pieces of paper.

In various embodiments, the disclosed technology performs a method, comprising: receiving a graphical image from an image capture device; receiving an electronic stamp; electronically affixing the received electronic stamp to the received graphical image to create a stamped graphical image; and printing on a printer the stamped graphical image. The method can include receiving information indicating a first current geographical position of the graphical communications device and requesting a first electronic stamp from a first agency authorized to provide electronic stamps suitable for postage in a first jurisdiction covering the indicated current geographical position. The method can include receiving information indicating a second current geographical position of the graphical communications device and requesting a second electronic stamp from a second agency authorized to provide electronic stamps suitable for postage in a second jurisdiction covering the indicated current geographical position, wherein the second stamp is different from the first stamp and the second agency is different from the first agency. The method can include deducting from an account charges relating to the first electronic stamp and the second electronic stamp. The electronic stamp can include an image representative of the first jurisdiction. The graphical image may be received from an image capture device that is internal to the graphical communications device. The graphical image may be received from an image capture device that is external to the graphical communications device. The graphical image may be received from the graphical communications device using a picture transfer protocol. The method can include determining an amount of postage. The printer can be internal to the graphical communications device. The printer can be external to the graphical communications device. The method can include receiving a postprocessing command and applying the received postprocessing command to the graphical image. The method can include receiving in image of a product label associated with a product. The method can include converting a price to a different currency than a currency indicated on the product label. The method can include displaying a menu including at least the product. The method can include printing a coupon for the product.

In various embodiments, the technology includes a system for handling images, comprising: a processor and memory; a component configured to store an address book; a component configured to provide a user interface; a component configured to receive an image; a component configured to postprocess the received image; a component configured to receive an electronic stamp; a component configured to add the received electronic stamp to the received image; and a component configured to print the received image. The system can include a component configured to detect motion. The component can include a microelectromechanical system (MEMS). The component configured to detect motion can transmit a signal indicating that the system for handling images is being moved. The system can include a component configured to transmit the received image. The received image may be transmitted wirelessly. The system can include a display, a speaker, and a microphone. The system can include a speech-to-text component and a translator component, wherein the system is configured to receive speech, convert the received speech to text, and translate the converted text to a different natural language than a natural language of the text. The system can include solar panels configured to recharge a power source. The system can include two displays, wherein one of the two displays is configured to be slid out from a main body. The system can include a virtual keyboard displayed on at least one of the two displays, wherein the at least one of the two displays is a touch-sensitive display.

In various embodiments, the mobile computing device can be used to enlarge documents. As an example, the mobile computing device can enlarge documents that are difficult to read. The mobile computing can enlarge text and other information captured by its camera, and display the enlarged information on its display. The mobile computing device may also translate the displayed information into a language with which the user is familiar.

In various embodiments, the mobile computing device includes a voice recognition system that receives speech from a speaker in one language, recognizes the received speech, translates the recognized speech into a different language, and displays the translated speech. Alternatively, the mobile computing device can render the translated speech audibly, e.g., using a text-to-speech component. Thus, the mobile computing device can be used by a user to understand communications from someone speaking a different language than the language with which the user is familiar. The mobile computing device can also be used to translate the user's speech for the benefit of the original speaker. As an example, the user can type in or speak a statement in the user's language and the mobile computing device can translate the statement into a different language. The text-to-speech component may even be able to mimic a local accent of native speakers of the language.

In various embodiments, the mobile computing device can be used to provide travel directions, keep track of position, etc. The mobile computing device can use GPS or triangulation techniques to compute its position.

In various embodiments, the mobile computing device can be used as a game console input device. As an example, the mobile computing device can broadcast movement information detected using its MEMS sensors, display controls on its screen, and receiving inputs from the user.

In various embodiments, the mobile computing device can include two display screens and a keyboard that can slide into a cavity when not in use to become hidden. The keyboard may be foldable so that the sizes of keys can be maximized. When the keyboard is folded, only some keys may be accessible. When the keyboard is unfolded, other keys may become accessible. When both screens are displayed and the keyboard is fully unfolded, the device may have a width of approximately 12 inches. In various embodiments, the second screen can replace the keyboard entirely by employing a touch screen with virtual keys. Thus, the user can use booth screens for display and when a keyboard is needed, either or both screens can display the keyboard. In various embodiments, the screens may provide a three-dimensional display, e.g., with or without use of other visual aids.

In various embodiments, two screens may be configured in a paperback book configuration so that text flows across both screens. The two screens could be oriented with a long dimension vertically. Then each page could be displayed on one or both screens, and virtual buttons can be displayed to enable the user to "turn" pages.

In various embodiments, various components may provide input instead of (or in addition to) users. As an example, some user actions need not be provided by a user but may be provided by other sources, e.g., an automation component.

From the foregoing, it will be appreciated that various embodiments of the present disclosure have been described herein for purposes of illustration, and that various modifications may be made without departing from the scope of the present disclosure. Accordingly, the various embodiments disclosed herein are not intended to be limiting, with the true scope being indicated by the following claims.

I claim:

1. A graphical processing device, comprising:
a processing port having a first wall portion spaced apart from a second wall portion to define a gap region therebetween, wherein the gap region is configured to receive a folded substrate having a first surface portion facing the first wall portion, a second surface portion facing the second wall portion, and a folded surface portion extending therebetween; and
at least one graphical processing head movably disposed proximate the processing port, wherein the at least one graphical processing head is configured to process visual images on the first, second, and folded surface portions of the folded substrate when the folded substrate is disposed in the gap region.

2. The graphical processing device of claim 1, wherein the at least one graphical processing head is further configured to process contiguous visual images on the first, second, and folded surface portions of the folded substrate when the folded substrate is disposed in the gap region.

3. The graphical processing device of claim 1, wherein the at least one graphical processing head includes a print head configured to print contiguous visual images on the first, second, and folded surface portions of the folded substrate when the folded substrate is disposed in the gap region.

4. The graphical processing device of claim 1, wherein the folded substrate is a preprinted substrate containing contiguous visual images on the first, second, and folded surface portions thereof, and wherein the at least one graphical processing head includes a scanner configured to scan the contiguous visual images on the first, second, and folded surface portions of the folded substrate when the folded substrate is disposed in the gap region.

5. A printer, comprising:
a printing port having a first guide wall spaced apart from a second guide wall to define a gap region therebetween, wherein the gap region is configured to receive a folded piece of paper having a first surface portion facing the first guide wall, a second surface portion facing the second guide wall, and a folded surface portion extending between the first and second surface portions; and
at least one print head movably disposed proximate the printing port, wherein the at least one print head is configured to print contiguous visual images on the first, second, and folded surface portions of the folded piece of paper when the folded piece of paper is received in the gap region.

6. The printer of claim 5, wherein the printing port is configured to receive a folded sheet of paper that is at least 6 inches wide.

7. The printer of claim 5, wherein the printing port includes an end wall extending between the first and second guide walls opposite an opening, and wherein the end wall is spaced apart from the opening by at least 6 inches.

8. The printer of claim 5, wherein the at least one print head is movably coupled proximate the first guide wall for printing the contiguous visual images on the first surface portion, and wherein the at least one print head is movably coupled proximate the second guide wall for printing the contiguous visual images on the second surface portion.

9. The printer of claim 5, wherein the printing port includes an end wall extending between the first and second guide walls opposite an opening, and wherein the at least one print head is a single print head configured to traverse the first guide wall, the second guide wall, and the end wall as the single print head prints the contiguous visual images on the first, second, and folded surface portions of the folded piece of paper.

10. The printer of claim 5, further comprising a paper cartridge positioned proximate the printing port and configured to hold a plurality of folded pieces of paper.

11. The printer of claim 5, wherein the at least one print head includes a visual image scanner.

12. The printer of claim 5, further comprising a processor operably coupled to memory and the at least one print head, wherein the at least one print head is configured to print an image stored in memory on the first, second, and folded surface portions of the folded piece of paper in response to instructions from the processor.

13. The printer of claim 5, further comprising:
a camera; and
a processor configured to store a digital image from the camera in memory, and wherein the at least one print head is configured to print the digital image on the first, second, and folded surface portions of the folded piece of paper in response to instructions from the processor.

14. A scanner, comprising:
a scanning slot configured to receive a folded piece of paper having a first surface portion facing a first direction, a second surface portion facing a second direction opposite the first direction, and a folded surface portion extending between the first and second surface portions proximate an end wall of the scanning slot; and
at least one scan head movably disposed proximate the scanning slot, wherein the at least one scan head is configured to scan visual images on the first, second, and folded surface portions of the folded piece of paper when the folded piece of paper received in the scanning slot.

15. A handheld mobile device, comprising:
a printing port configured to receive a folded piece of paper having a first surface portion facing a first direction, a second surface portion facing a second direction opposite the first direction, and a folded surface portion extending between the first and second surface portions; and
at least one print head movably disposed proximate the printing port, wherein the at least one print head is configured to print visual images on the first, second, and folded surface portions of the folded piece of paper when the folded piece of paper is received in the printing port.

16. The handheld mobile device of claim 15, further comprising a camera, wherein the at least one print head is configured to print visual images from the camera on the first, second, and folded surface portions of the folded piece of paper when the folded piece of paper is received in the printing port.

17. The handheld mobile device of claim 16, further comprising a zoom lens capable of zooming from a wide angle to a telephoto angle.

18. The handheld mobile device of claim 15, further comprising a wireless Internet access facility, wherein the at least one print head is configured to print visual images downloaded via the wireless Internet facility on the first, second, and folded surface portions of the folded piece of paper when the folded piece of paper is received in the printing port.

19. The handheld mobile device of claim 15, further comprising a microphone component and a speaker component.

20. The handheld mobile device of claim 19, wherein measurements of the handheld mobile device are less than 7 inches in a first dimension, less than 5 inches in a second dimension, and less than 2 inches in a third dimension.

21. The handheld mobile device of claim 15, further comprising a microelectromechanical system (MEMS) configured to detect movement and/or orientation of the handheld mobile device.

22. The handheld mobile device of claim 21, further comprising a display, wherein an orientation of an image rendered on the display is modified based on a signal received from the MEMS.

23. The handheld mobile device of claim 21, further comprising a removably attached tray capable of housing zero or more pieces of paper.

* * * * *